United States Patent [19]
Stiner et al.

[11] 3,944,262
[45] Mar. 16, 1976

[54] INSULATED METER RISER

[75] Inventors: Roy E. Stiner; Robert P. Gardner, both of Tulsa, Okla.

[73] Assignee: Continental Industries, Inc., Tulsa, Okla.

[22] Filed: Sept. 12, 1974

[21] Appl. No.: 505,472

[52] U.S. Cl. .................................. 285/53; 285/249
[51] Int. Cl.² ..................... F16L 57/00; F16L 33/20
[58] Field of Search ............. 285/55, 53, 47, 45, 54, 285/52, 50, 48, 51, 49, 249

[56] References Cited
UNITED STATES PATENTS

| | | | |
|---|---|---|---|
| 2,937,036 | 5/1960 | Watkins | 285/53 X |
| 3,137,143 | 6/1964 | Jacobs et al. | 285/47 X |
| 3,207,533 | 9/1965 | Van Gundy et al. | 285/47 X |
| 3,369,826 | 2/1968 | Boosey et al. | 285/47 |
| 3,861,719 | 1/1975 | Hand | 285/47 |

FOREIGN PATENTS OR APPLICATIONS

| | | | |
|---|---|---|---|
| 699,586 | 12/1964 | Canada | 285/47 |
| 1,130,654 | 5/1962 | Germany | 285/47 |

*Primary Examiner*—Thomas F. Callaghan
*Attorney, Agent, or Firm*—Head & Johnson

[57] ABSTRACT

A meter riser for connecting normally buried plastic pipe to metallic couplings which are normally disposed above the ground for connection with utility meters, such as gas meters and the like, and comprising means for connecting the plastic pipe being encased in a metallic sheath, and having insulating means disposed around at least a portion of the metallic sheath and plastic pipe in the proximity of the connecting means securing the plastic pipe to the metallic coupling for protecting the plastic pipe against adverse environmental conditions.

6 Claims, 6 Drawing Figures

INSULATED METER RISER

CROSS-REFERENCE TO RELATED APPLICATION

This application is related to a companion application prepared and executed substantially simultaneously herewith and entitled "Liquid Cooled Meter Riser", Ser. No. 500,548, filed Aug. 26, 1974.

BACKGROUND OF THE INVENTION

1. Field of the Invention

This invention relates to improvements in meter risers and more particularly, but not by way of limitation, to an improved means for connecting plastic pipe to metallic connection members and protecting the plastic pipe against adverse environmental conditions.

2. Description of the Prior Art

In the gas distribution industry, and the like, wherein natural gas, or other fluids, are transmitted to a plurality of individual consumers by a main distribution system, which is normally buried, and which transports or directs the fluid to individual distribution lines having meters interposed therein which are normally disposed above the ground. In the past, the pipe lines of the main distribution system as well as the individual lines and all of the connecting members were metallic, but in recent years the use of plastic materials has become widespread and it is common practice to use plastic pipe for transmitting or transporting the gas or other fluids. A problem exists, however, in that many plastic materials melt or flow at relatively low temperatures, and any exposure of the plastic material to direct sunlight, or relatively high ambient temperatures may deform or otherwise damage the plastic pipe, which may cause undesirable leakage of the gas or fuel therefrom. As a consequence, safety codes in many places prohibit the use of plastic pipe above the surface of the ground for connection with the meter.

In order to overcome this problem, the gas distribution industry, and the like, has provided relatively short lengths of metal pipe, called meter risers, which attach to the buried plastic pipe, and bend upwardly and extend above the surface of the ground for connection with the meter. One disadvantage of this solution to the problem is that the metallic pipe is surrounded by the earth between the connection thereof with the plastic pipe and the surface of the ground, and galvanic action erodes the metallic pipe, causing leakage. As a result it is necessary to connect anodes to the metallic pipe, or otherwise protect the metallic pipe from the corrosion due to the galvanic action. In addition, it is necessary to periodically inspect the buried metallic pipe for ascertaining that the anodes are functioning properly, or that the pipe is being properly protected against erosion. It will be apparent that this increases the expense of using metallic pipe, and greatly adds to the inconvenience in the use thereof, rendering the use of metallic meter risers undesirable.

SUMMARY OF THE INVENTION

The present invention contemplates a novel meter riser which has been particularly designed and constructed for overcoming the above disadvantages. The novel meter riser comprises a substantially L-shaped metallic sheath surrounding a plastic pipe complementary to the plastic pipe of the main distribution system, or the like, whereby one end of the plastic pipe within the metallic sheath may be fused, welded, cemented, or otherwise connected with the plastic pipe of the main gas distribution line. The opposite end of the plastic pipe within the metallic sheath may be connected directly with the metallic coupling or connection member which is connected with the usual meter. Thus, the novel meter riser extends from the buried main distribution line to a point above the ground for connection with the meter coupling. An insulating assembly is disposed around the novel meter riser at the connection thereof with the meter coupling, and extends slightly below the surface of the ground in order to protect the plastic pipe within the metallic sheath, as well as the metallic sheath, from adverse environmental conditions in the earth and in the atmopshere surrounding the meter riser. In addition, heat sink means, either internal or external, is provided surrounding a portion of the metallic sheath for reducing temperature build up in the proximity of the plastic pipe. Thus, the novel meter riser of the present invention permits the use of plastic pipe for transporting gas, or the like, to the meter without the danger of exposing the plastic pipe to extremely high temperature conditions, or other adverse environmental conditions, thus eliminating the disadvantages of metallic pipe interposed between the meter and the plastic main distribution line without the inherent dangers of using plastic pipe for connection with the meter. The novel insulated meter riser is simple and efficient in operation and economical and durable in construction.

DESCRIPTION OF THE PREFERRED EMBODIMENT

Figure 1:
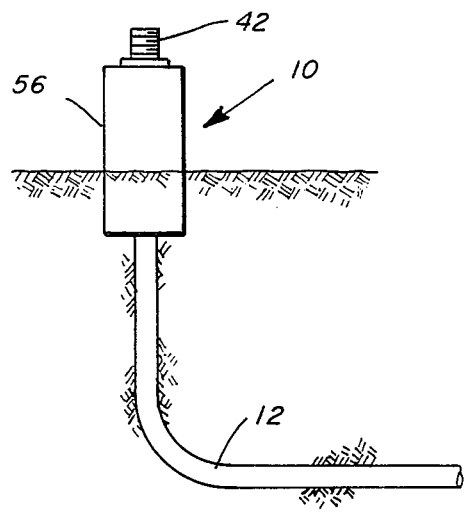
FIG. 1 is a sectional view, partly in elevation, depicting an insulated meter riser embodying the invention installed between a main distribution line and a meter coupling.
Figure 3:
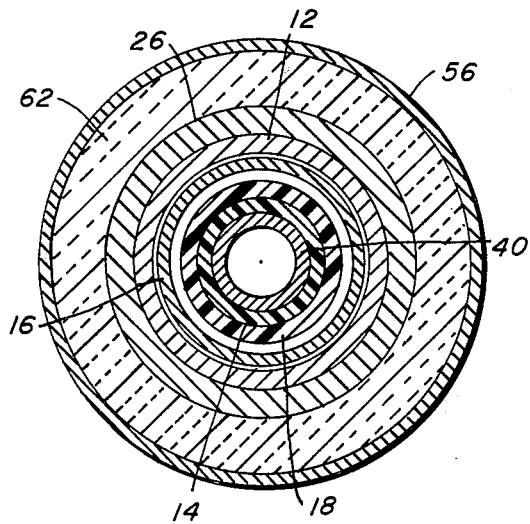
FIG. 3 is a view taken on line 3—3 of FIG. 2.
Figure 2:
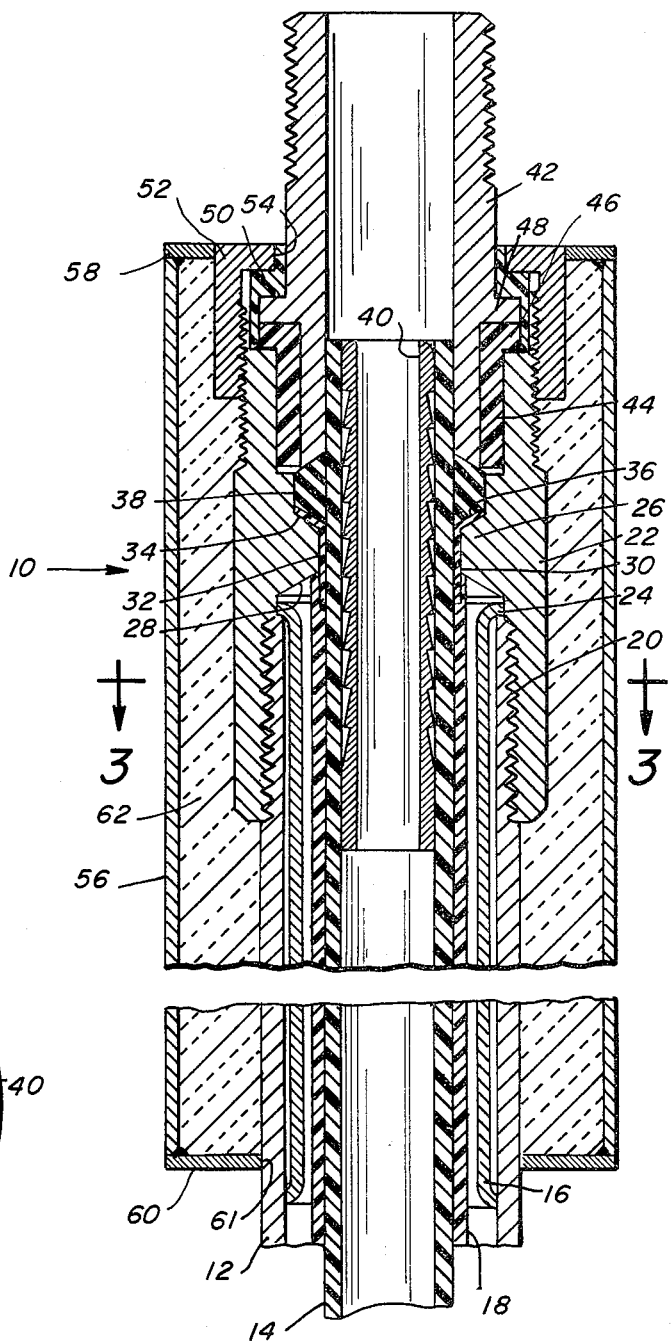
FIG. 2 is a broken sectional elevational view of an insulated meter riser embodying the invention.

Referring to the drawings in detail, and particularly FIGS. 1 through 3, reference character 10 generally indicates an insulated meter riser comprising a metallic sheath or riser body 12, preferably of a substantially angular configuration as shown in FIG. 1, having a plastic service tubing 14 centrally disposed therein and extending longitudinally therethrough. The plastic service tubing 14 is preferably of a size and material complementary with the plastic tubing of the main distribution system (not shown) with which the riser 10 is to be utilized whereby the tubing 14 may be fused, bonded, or otherwise united with the main distribution line for a purpose as will be hereinafter set forth. A metallic sleeve 16 is interposed between the sheath 12 and the service tubing 14 to provide an internal heat sink for the riser 10, and a suitable plastic liner sleeve 18 is disposed around the outer periphery of the tubing 14 in radially spaced ralation to the heat sink tube 16.

The upper end of the sheath 12, as viewed in FIG. 2, is threaded as shown at 20 for receiving a metallic line shield nut 22 thereon. The upper end of the heat sink tube 16 is flared outwardly as shown at 24 for engaging the upper end of the sheath 12, and an a annular flange 26 is provided on the inner periphery of the nut 22 having a downwardly facing tapered annular shoulder 28 for facilitating the retaining of the heat sink tube 16 in position.

The inner periphery of the plastic liner 18 is recessed at one end thereof as shown at 30 for receiving one end of a suitable plastic insulator 32 therein. The opposite end of the insulator 32 is provided with an outwardly flaring circumferential flange 34 which engages an upwardly facing tapered annular shoulder 36 provided on the flange 26, and an annular rubber seal ring 38 of a complementary configuration is disposed against the flange 34 in sealing engagement therewith. A suitable metallic stiffener member 40 is inserted within the uppermost end of the service tubing 14, and a suitable metallic adapter coupling 42 is frictionally secured to the outermost end of the plastic service tubing 14 as particularly shown in FIG. 2.

An insulator sleeve 44 is interposed between the coupling 42 and the shield nut 22, and is provided with an outwardly extending flange 46 at one end thereof which engages the outer end of the shield nut 22. An outwardly extending circumferential flange 48 is provided on the outer periphery of the coupling 42 in spaced relation from the lowermost end thereof as viewed in the drawings, for engagement with the flange 48 for securely retaining the flange 48 against the shield nut 22. A suitable plastic insulator cup 50 is disposed around the outer periphery of the adapter 42 and surrounding the portion of the flange 48 not protected by the sleeve 44, and a metallic compression nut 52 having a central bore 54 for receiving the adapter 42 therethrough is threadedly secured to the upper end of the shield nut 22 for retaining the adapter 42 securely connected with the sheath 12.

A metallic cylindrical outer shield 56 is concentrically arranged around the outer periphery of the compression nut 52 and radially spaced therefrom to an annular closure plate 58. The outer shield 56 extends longitudinally downwardly, as viewed in FIGS. 1 and 2 a distance preferably slightly less than the lowermost end of the heat sink tube 16, as will be seen in FIG. 2. The lower end of the protective shield 56 is closed by an annular closure plate 60 having a central aperture 61 provided therein for receiving the sheath 12 therethrough. The annular space within the shield 56 contiguous with the inner periphery thereof is filled with a suitable foam insulation material 62 as clearly shown in FIG. 2.

In use, the plastic tube or pipe 14 is connected to the main distribution system (not shown) in any well known manner, such as by fusing, cementing, or the like, and the sheath 12, by virtue of its L-shaped configuration, extends upwardly whereby the shield 56 extends at least partially above the surface of the ground as shown in FIG. 1. The coupling 42 may be connected with the usual meter (not shown) in any well known manner, such as by threaded connection therewith. It will be readily apparent that the insulation material 62 protects the internal elements of the meter riser 10 against any excessive ambient temperatures and against any adverse atmospheric conditions, as well as any adverse soil conditions surrounding the device 10. The internal heat sink 16 protects the meter coupling 42 against catalytic action and it will be apparent that the plastic pipe 14 is thus protected against damage from the atmosphere or the surrounding soil. In this manner, plastic pipe may be utilized for conveying or transporting the fluid from the main distribution system to the meter coupling 42.

Figure 4:
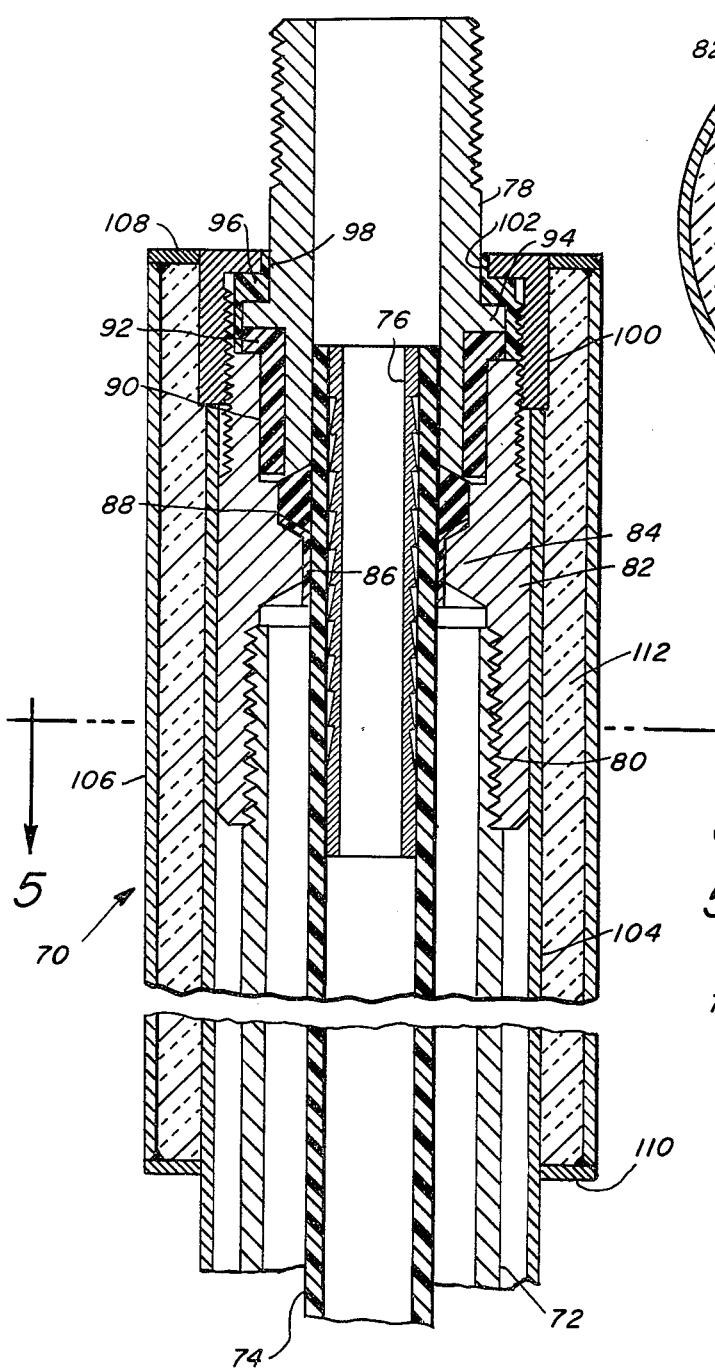
FIG. 4 is a broken sectional elevational view of a modified insulated meter riser embodying the invention.
Figure 5:
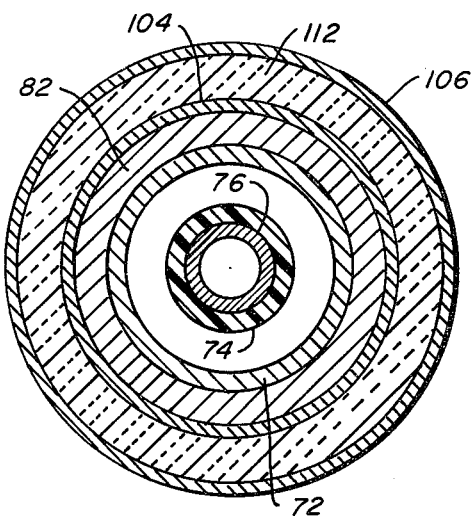
FIG. 5 is a sectional view taken on line 5—5 of FIG. 4.
Figure 6:
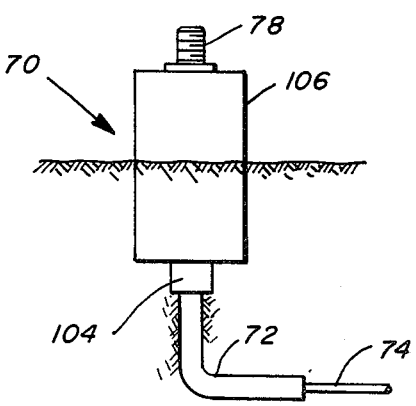
FIG. 6 is a view similar to FIG. 1 illustrating the modified insulated meter riser shown in FIGS. 4 and 5.

Referring now to FIGS. 4, 5 and 6, a modified meter riser is generally indicated at 70 which comprises a metallic sheath or riser body 72 having a plastic pipe 74 concentrically disposed therein. The riser body 72 is preferably of a sub-L-shaped configuration, as shown in FIG. 6, and as is well known, and the plastic pipe 14 extends longitudinally through the sheath 72 and preferably therebeyond as shown in FIG. 4. A suitable metallic stiffener tube 76 is secured within the upper end of the plastic pipe 74, as viewed in FIG. 4, and the upper end of the pipe 74 is inserted within a suitable meter coupling or adapter 78 for securing the plastic pipe 74 thereto. The upper end of the sheath 72 is threaded as shown at 80 for receiving one end of the metallic line shield nut 82 thereon.

An inwardly directed annular flange 84 is provided on the inner periphery of the nut 82. A suitable flanged insulator sleeve 86 is interposed between the flange 84 and plastic pipe 74, and is preferably supported by the flange 84 as shown in FIG. 4. An annular rubber or resilient seal ring 88 is interposed between the nut 82 and the pipe 74 above the insulator sleeve 86, and is retained in position against the insulator sleeve 86 by the lower end of the coupling 78. A second insulator sleeve 90 is disposed around the outer periphery of the coupling 78 immediately above the ring 88, and is provided with an outwardly extending circumferential flange 92 which is supported by the upper end of the nut 82. An outwardly extending circumferential flange 94 is provided on the outer periphery of the coupling 78 spaced above the lower end thereof as seen in the drawings, and bears against the flange 92 for securely retaining the flange 92 in position against the upper end of the nut 82. A suitable insulator cup 96 is provided with a central bore 98 in one end thereof for receiving the coupling 78 therethrough and is supported by the flange 94, with the sidewalls thereof extending downwardly for protection of the outer periphery of the flange 94 and the insulator 92. A metallic compression nut 100 is provided with a central bore 102 in one end thereof for receiving the insulator 96 therethrough and extends downwardly into threaded connection with the upper end of the nut 82 for retaining the coupling 78 secured to the sheath 72.

A metallic heat sink tube 104 is concentrically disposed around the sheath 72 and preferably has one end thereof in abuttment with the lower end of compression nut 100. The heat sink tube 104 is preferably constructed from copper, or the like, but not limited thereto, and the lowermost end thereof is sealed or connected with the outer periphery of the sheath 72 in any well known manner (not shown).

A metallic protective outer shield 106 is concentrically arranged around the outer periphery of the heat sink tube 104. One end of the shield 106 is secured around the outer periphery of the compression nut 100 by an annular end closure member 108, and the opposite end thereof is secured around the outer periphery of the heat sink tube 104 by an annular closure member 110 which is spaced upwardly from the lowermost end of the tube 104, as seen in the drawings. The annular space between the shield 106 and the heat sink 104 is filled with suitable foam insulation material 112, which completely fills the said annular space.

In the particular embodiment shown in FIGS. 4, 5 and 6, it will be apparent that the heat sink 104 may be considered as an external heat sink. In use, the apparatus 70 may be installed substantially as hereinbefore set forth, and functions in much the same manner.

From the foregoing it will be apparent that the present invention provides a novel insulated meter riser wherein a plastic pipe may be suitably connected between a main distribution system and the meter coupling in a manner which eliminates any danger to the plastic pipe from ambient temperature or other atmospheric or soil conditions. The plastic pipe is efficiently insulated for protection thereof to eliminate any inherent dangers which may arise from using a plastic pipe in this environment.

Whereas the present invention has been described in particular relation to the drawings attached hereto, it should be understood that other and further modifications, apart from those shown or suggested herein, may be made within the spirit and scope of this invention.

What is claimed is:

1. An insulated meter riser comprising a substantially L-shaped metallic sheath member, plastic pipe means concentrically disposed within said sheath member and extending longitudinally therethrough for connection between a buried plastic pipe and a metallic meter coupling, first compression nut means secured to one end of the sheath means, second compression nut means secured to the first compression nut means and cooperating with the meter coupling for securing the sheath means to the meter coupling, heat sink means disposed around at least a portion of the plastic pipe means, protective shield means disposed around at least a portion of the heat sink means, and foam insulation material disposed within the annular space contiguous with the inner periphery of the protective shield means for insulation of the plastic pipe against ambient temperature conditions.

2. An insulated meter riser as set forth in claim 1 wherein the heat sink means is concentrically arranged with respect to the plastic pipe means and interposed between the plastic pipe means and sheath means for providing an internal heat sink for the meter riser.

3. An insulated meter riser as set forth in claim 1 wherein the heat sink means is concentrically arranged around the outer periphery of at least a portion of the sheath means for providing an external heat sink for the meter riser.

4. An insulated meter riser as set forth in claim 3 wherein the foam insulating material is disposed between the heat sink means and protective shield means.

5. An insulated meter riser comprising a metallic sheath member of a substantially L-shaped configuration, a plastic pipe concentrically disposed within the sheath member and extending longitudinally therethrough for connection with a metallic meter coupling, a first compression nut threadedly secured to one end of the sheath member, a second compression nut disposed around a portion of the meter coupling and in threaded engagement with the first compression nut for securing the sheath member to the meter coupling, insulating means interposed between both the compression nuts and the meter coupling, a metallic heat sink member concentrically disposed around the sheath member and extending from the second compression nut throughout at least a portion of the length of the sheath member, an outer protective shield member concentrically disposed around the heat sink member, and foam insulating material disposed in the annular chamber contiguous with the inner periphery of the protective shield member for insulating the plastic pipe against ambient temperatures.

6. An insulated meter riser comprising a metallic sheath member of substantially L-shaped configuration, a plastic pipe concentrically disposed within the sheath member and extending longitudinally therethrough for connection with a meter coupling, a plastic liner disposed around the outer periphery of the plastic pipe, a heat sink member interposed between the plastic liner and the sheath member and extending longitudinally through at least a portion of the length of the sheath member, a first compression nut threadedly secured to one end of the sheath member, a second compression nut disposed around a portion of the meter coupling and in threaded engagement with the first compression nut for securing the sheath member to the meter coupling, insulating means interposed between both compression nuts and the meter coupling, an outer protective shield concentrically arranged around the compression nuts and at least a portion of the sheath member, and form insulating material disposed in the annular space contiguous with the inner periphery of the protective shield for insulating the plastic pipe against ambient temperatures.

* * * * *